April 11, 1950     C. A. WECKEL     2,503,366
FREE SPOOL TRIPLE MULTIPLYING BAIT CASTING REEL Filed Feb. 12, 1946     2 Sheets-Sheet 1

Inventor
CLYDE A. WECKEL,

By *McMorrow, Berman Davidson*
Attorneys

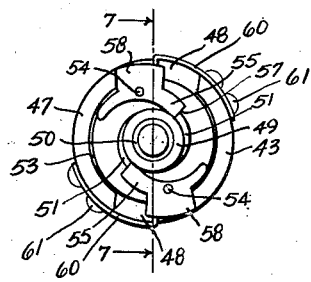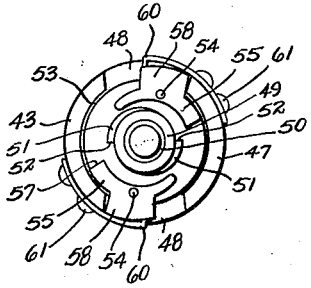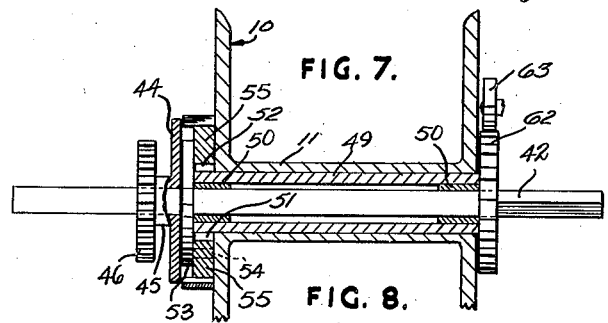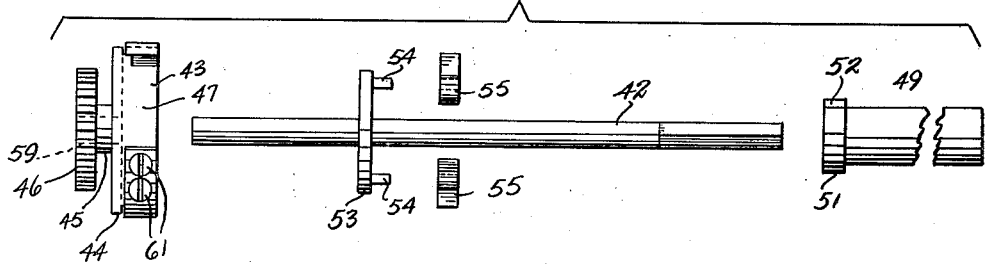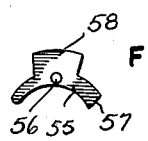

Patented Apr. 11, 1950

2,503,366

UNITED STATES PATENT OFFICE 2,503,366

FREE SPOOL TRIPLE MULTIPLYING BAIT CASTING REEL

Clyde A. Weckel, Salina, Kans.

Application February 12, 1946, Serial No. 647,119

2 Claims. (Cl. 242—84.7)

My invention relates to bait casting reels and more particularly to a bait casting reel permitting its spool to rotate freely forwardly when a cast is made.

The object of my invention is to provide a bait casting reel in which only the spool and no other part rotates forwardly when a cast is made.

A further object of my invention is to provide a bait casting reel in which the tendency of the spool to overrun is eliminated.

Another object of the invention is to provide a bait casting reel in which all anti-backlash mechanisms are eliminated whereby the distance of the cast is increased.

A still further object of my invention is to provide a bait casting reel in which the grip of the clutch or brake on the spool is proportional to the pull on the line.

Other objects of my invention may appear in the following specification describing my invention with reference to the accompanying drawings illustrating a preferred embodiment of my invention. It is however to be understood that my invention is not to be limited or restricted to the exact construction and combination of parts described in the specification and shown in the drawings, but that such changes and modifications can be made, which fall within the scope of the claims appended hereto.

In the drawings:

Figure 5 is an end view of a modified form of the spool brake shown in position to connect the spool with the main shaft for rearward rotation.

Figure 6 is an end view similar to Figure 5 but showing the spool brake in position to permit free rotation of the spool in any direction.

Figure 7 is a sectional view taken on line 7—7 in Figure 5.

Figure 8 is an exploded elevational side view of the modified form of the brake shown in Figures 5 and 6, and Figure 9 is a detail view of a detent pawl used in connection with the modified form of the brake shown in Figures 5 and 6.

Figure 1:
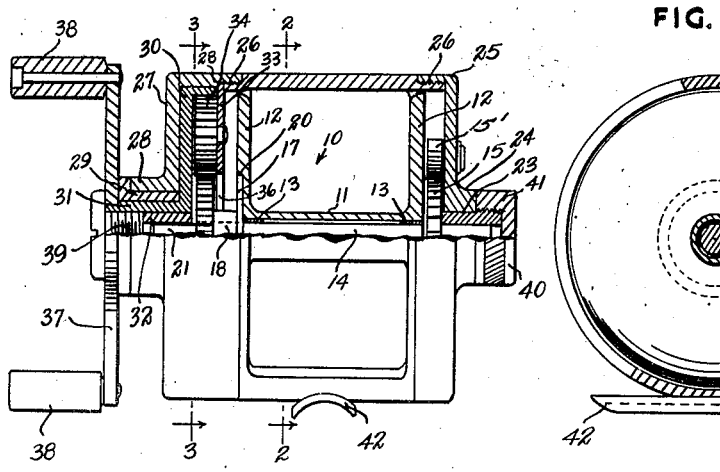
Figure 1 is a side elevation of a bait casting reel according to my invention, partly shown in section.
Figure 2:
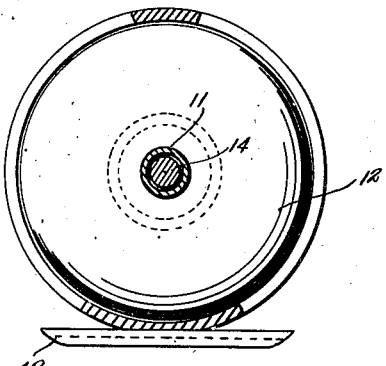
Figure 2 is a sectional view taken on line 2—2 in Figure 1.
Figure 3:
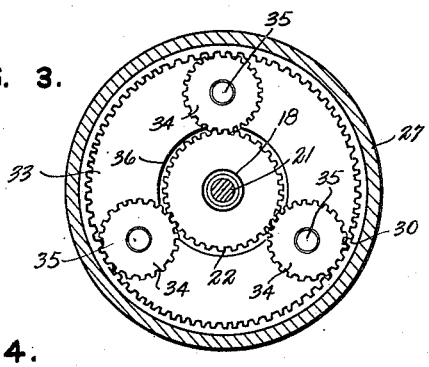
Figure 3 is a sectional view taken on line 3—3 in Figure 1.
Figure 4:
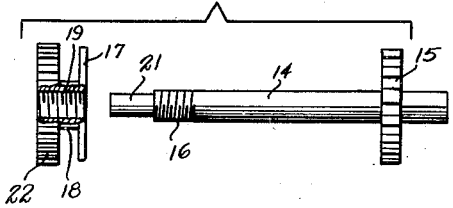
Figure 4 is an exploded view of the assembly of the spool spindle with the attached brake disk and the brake gear with the second brake disk.

Referring now to the drawings in detail the bait casting reel forming the subject matter of my invention has a spool 10 with a hollow cylindrical body 11 and two circular end flanges 12. In the bore of the cylindrical body 11 adjacent each end thereof a bearing 13 is arranged and a spindle 14 is rotatably supported therein. A click gear 15 is rigidly mounted on or integrally formed with said spindle and is arranged adjacent the right hand flange 12 of the spool 10. A conventional click 15' is operatively associated with click gear 15, Fig. 1. The spindle extends beyond the click gear 15.

On the part of the spindle 14 extending beyond the left hand spool flange a left hand thread 16 is provided. A clutch disk 17 has a hub 18 formed thereon and extending therefrom. This hub has an internal left hand thread 19 therein adapted to engage the thread 16 on the spindle 14. The left hand flange 12 has in its outer surface a counterbore 20 coaxial with the bore of the spool and adapted to receive the clutch disk 17 therein. The spindle 14 extends beyond the threaded portion 16 and forms a journal 21 which has a smaller diameter than the main portion of the spindle.

On the outer end of the hub 18 a gear 22 is rigidly mounted, and when the unit consisting of clutch disk 17, hub 18 and gear 22 is threadedly mounted on the spindle 14, the journal 21 extends beyond the gear 22.

The part of the spindle extending beyond the click gear 15 is journalled in a bearing 23 stationarily arranged in a hub 24 of a right hand end cap 25.

An open cylindrical frame has an outside thread 26 on each of its ends. The right hand end cap 25 threadedly engages the frame on its right hand end. A left hand end cap 27 has an inside thread adapted to engage the thread on the left hand end of the frame. Adjacent the inside end of the thread in the left hand end cap 27 a circumferential shoulder 28 is formed, and the cap has an outwardly extending hollow hub 28 in which a bearing 29 is stationarily arranged.

Inside of the left hand end cap 27 a cup-shaped internal gear 30 is rotatably positioned. It has a hollow hub 31 which is rotatably positioned in the bearing 29. The outer end of the hub 31 of the internal gear 30 is shaped square on the outside and is provided with an inside thread. In the inner portion of the same hub a bearing 32 is stationarily arranged adapted to rotatably support the reduced spindle portion 21.

A circular gear plate 33 supports three pinions 34 of equal dimensions rotatably mounted on pins 35, located at 120° from each other on said gear plate. A hole 36 located axially in the gear plate permits the clutch gear 22 to enter therethrough.

A crank lever 37 has two handles 38 thereon and a square hole in its center adapted to receive the squared outer portion of the hub 31 which extends beyond the bearing 29.

A screw 39 engages the thread in the hub 31 and secures the crank lever 37 on the hub 31.

To assemble the bait casting reel forming the subject matter of my invention, insert the cup-shaped internal gear 30 inside the left end cap 27 so that the hub 31 is located in the bearing 29, which is arranged in the hub 28 of the cap 27. The squared end of the hub 31 extends beyond the bearing 29 and the crank lever 37 is placed on this end, where it is secured by the screw 39 engaging the inner thread of the hub 31 of the internal gear 30

The pinions 34 are placed on the pins or studs 35 on the gear plate 33. This unit is then arranged in the left end cap 27 so that the gear plate 33 rests on the shoulder 28 in the cap and the pinions face toward the left.

The spindle 14 is inserted into the bore of the spool 10 so that the click gear 15 engages the right flange 12. The threaded part 16 of the spindle extends beyond the left spool flange 12 and the unit consisting of the clutch gear 22, and the clutch disk 17 with its hub 18 is screwed onto the spindle so that the clutch disk 17 of this unit will be located in the counterbore 20 in the left spool disk 12.

The last described unit is then arranged so in relation to the first described assembled parts so that the reduced spindle portion 21 is rotatably located in the bearing 32 in the hub 31 of the internal gear 30 and that the brake gear will extend through the hole 36 in the gear plate 33 and mesh with the three pinions 34.

Then the cylindrical frame is connected to the left end cap 27 by screwing this cap onto the frame so that the spool is located inside the frame and the right hand end of the spindle 14 extends beyond the frame. Then the right end cap 25 is screwed onto the frame so that the right end of the spindle will be rotatably supported in the bearing 23 in the hub 24 of the cap 25.

The bearing 23 extends beyond the hub 24 and is outwardly threaded. A cap 40 is adapted to be screwed onto this bearing as shown at 41 to close and protect the right end of the reel.

On the lower part of the frame a foot or base 42 of well known conventional construction is provided by means of which the reel can be fastened to a fishing rod.

The modification of the spool brake shown in Figures 5, 6, 7, 8 and 9 has a shaft 42, which is rotatably supported in bearings (not shown) corresponding to the bearings 23 and 32. A driving clutch member 43 has a flat circular web, the outer end surface 44 of which is formed to provide an axially, outwardly-directed hub 45.

A gear 46 carried on the outer end of such hub is either formed integrally therewith or is rigidly fastened thereon. Gear 46 is similar to gear 22, aforesaid, and is arranged in the same way as such gear so as to mesh with pinions (not shown) corresponding to the pinions 34 on the gear plate 33 aforesaid. On the opposite side of the end surface of web 44 a substantially annular and inwardly-directed wall 47 is provided. Such wall 47 has formed therein two diametrically-opposed cut-outs 48 for a purpose to be described later.

A hollow shaft 49, is adapted to support the spool 10, which is firmly mounted thereon, the hollow shaft having a press fit in the bore of the cylindrical spool body 11. The shaft 42 is rotatably arranged relative to the hollow shaft 49 in two bearings 50 provided inside of the hollow shaft adjacent its ends.

The hollow shaft 49 has a hub formed on one of its ends, such hub being formed with two diametrically opposite cams or ratchet teeth 51 which may be integrally formed with said shaft or rigidly mounted thereon. Each cam has a diametrically extending end face 52.

A driven clutch member comprising a disc 53 is rigidly mounted on the shaft 42 so that it will be located adjacent the inner surface of the web of the driving clutch member 43 and inside of the substantially annular wall 47 thereof. Two studs or pins 54 are fixed on the inner surface of disc 53 and extend axially inwardly thereof at right angles to the disk 53 and are rigidly connected therewith diametrically opposite to each other.

Two arcuate pawls 55 have each a hole 56 therein so that they can be mounted pivotally on the studs 54. The body of each pawl is tapered toward one end and the other end has a radially extending face 57. The hole 56 is located approximately in the angular center of the arc of each pawl and a lug 58 is formed on the outside of each pawl just above the hole.

The unit comprising gear 46, hub 45 and web 44 is formed with an axial bore 59 adapted to receive the shaft 42 rotatably therein. As stated above the shaft 42 is rotatably supported in the bearings 23 and 32. The unit consisting of the gear 46, hub 45 and clutch element 43 is rotatably mounted on the shaft 42 so that the gear 46 extends through the hole 36 in the gear plate 33 and meshes with the pinions 34. The pawls 55 are mounted on the studs 54 on the disk 53 which fits into the annular wall 47 of the clutch member 43 and are disposed adjacent the inner surface of web 44 of said member. The pawls are positioned so that the lugs 58 thereon which are somewhat smaller than the cut outs 48 in the circular wall 47, are located in said cut outs, whereby to provide a lost-motion connection between the driving member 43 of the clutch and the driven member 53 thereof.

Each lug 58 is slidably engaged by a leaf spring 60 fastened to the outside circumference of the annular wall 47 of the driving clutch member 43 by means of screws or the like 61. The free end of each leaf spring 60 engages a lug 58 and is disposed so as to exert pressure on said lug at one side or the other of the pivot 54 so that the pawl will be pivoted about its pivot in either a clockwise or counter-clockwise direction. Thus, the pawl is always loaded for movement in either a clockwise or a counter-clockwise direction and is always engaged or disengaged with the related ratchet teeth 52. Thus, with the face 57 depressed, Figure 5, the teeth 57 of the pawl are depressed so as to engage the ratchet teeth 52. A relative lost-motion movement of the driving clutch member 43 through the lost-motion connection in a clockwise direction, Figure 6, will move the spring 60 from the Figure 6 to the Figure 5 position so as to pivot the pawls 55 into the position shown in Figure 5. With the pawls in the Figure 5 position, clockwise rotation of the driving clutch member 43 will drive the driven clutch member 53 in the same direction and also, through the pawls 55, will rotate the spool by virtue of the ratchets 52. In like manner, a short rotation of the driving clutch member 43 in a counter-clockwise direction will move the spring 60 to the Figure 6 position where it will depress the opposite end of the pawl to raise the tooth 57 thereof out of engagement with the cams or ratchet teeth 52. With the parts in the Figure 6 position, continued rotation of the driving clutch member 43 in a counter-clockwise direction will have no further effect and the spool will be free to rotate relative thereto.

Relative movement of the driving and driven clutch members may be accomplished by rotating the crank while leaving the click mechanism set to a clicking position in a well-known manner. Such well-known click is illustrated at 62 and 63, Figure 7.

The first-described arrangement of the invention, Figures 1 to 4, inclusive, operates in substantially a similar manner. In this form of the invention, a short turn of the crank lever 37 in a clockwise direction, Figure 1, will rotate the unit consisting of the gear 22, hub 18 and clutch disc 17, so that it will travel axially on the left-hand thread 16 of the spindle to bring the disc 17 into engagement with the spool flange 12, so that the spool will be rotated by means of the crank lever. To permit the spool 10 to rotate freely on its shaft, a short reverse counter-clockwise rotation of the crank lever 37 imparts a reverse axial movement to the related parts including the disc 17 in the direction disengaging the disc 17 from the spool 10.

Having described my invention what I claim and desire to secure by Letters Patent is:

1. A bait casting reel having a crank lever, a spool and a body frame including an end cap for each end of the body frame, an internal gear rotatably supported by one of said caps and adapted to be rotated by the crank lever, a plurality of pinions meshing with the internal gear, a clutch gear meshing with the pinions, a clutch element rigidly connected with the clutch gear, a main shaft rotatably supported by the internal gear and the second end cap, the clutch gear and clutch element being rotatably mounted on the main shaft, a disk rigidly mounted on the main shaft, two diametrically opposite studs on the disk, a pawl pivotally mounted on each stud, a hollow spool shaft, the spool being rigidly mounted thereon, the spool shaft being rotatably mounted on the main shaft, two cams on the spool shaft adjacent the end thereof next to the disk on the main shaft, and means on the clutch element for pivoting the pawls into and out of cam engaging position.

2. In a fishing reel, the combination with a frame, a shaft journaled in said frame, a spool freely rotatable on said shaft, and a crank freely rotatable on said shaft; of a hub formed on said spool outwardly of one end thereof, ratchet teeth formed on the periphery of said hub, a disc fixed on said shaft adjacent said hub, at least one pawl, a pivot pivoting said pawl to said disc and overlying said hub, said pawl having a tooth engageable with said ratchet teeth, said pawl including an arcuate outer surface extending in both clockwise and counter-clockwise directions relative to said pivot, a clutch member journaled on said shaft outwardly of said disc, said clutch member being formed with means providing a lost-motion connection with said pawl, a spring carried by said clutch and slidably bearing on said arcuate surface of said pawl to load said pawl for pivotal movement, means operatively connecting said crank to said clutch member to rotate the same, rotation of said crank in one direction being operative to move said clutch and spring relative to said pawl whereby to load the latter in a ratchet-engaging direction whereby to drive said spool, and rotation of said crank in the opposite direction being operative to move said clutch and spring relative to said pawl whereby to load said pawl to a ratchet-disengaging position and uncouple said spool from said clutch.

CLYDE A. WECKEL.

REFERENCES CITED

The following references are of record in the file of this patent:

UNITED STATES PATENTS

| Number | Name | Date |
|---|---|---|
| 865,613 | Schreidt | Sept. 10, 1907 |
| 1,574,719 | White | Feb. 23, 1926 |
| 1,663,800 | Kutzky, Jr. | Mar. 27, 1928 |
| 1,943,981 | Maynes | Jan. 16, 1934 |
| 2,172,824 | White | Sept. 12, 1939 |
| 2,219,322 | King | Oct. 29, 1940 |
| 2,335,752 | Geiger | Nov. 30, 1943 |

FOREIGN PATENTS

| Number | Country | Date |
|---|---|---|
| 324,595 | Great Britain | Jan. 30, 1930 |
| 659,255 | Germany | Apr. 29, 1938 |